United States Patent [19]

Clark, III

[11] Patent Number: 5,761,331

[45] Date of Patent: Jun. 2, 1998

[54] METHOD AND APPARATUS FOR TOMOGRAPHIC IMAGING AND IMAGE RECONSTRUCTION USING RECOMBINANT TRANSVERSE PHASE DIFFERENTIALS

[75] Inventor: William T. Clark, III, Folsom, La.

[73] Assignee: Intellectual Property Group of Pillsbury Madison & Sutro LLP, Washington, D.C.

[21] Appl. No.: 463,532

[22] Filed: Jun. 5, 1995

[51] Int. Cl.[6] ............................................ G06F 17/00
[52] U.S. Cl. ............................ 382/131; 378/4; 382/254; 382/132
[58] Field of Search .......................... 382/132, 131, 382/130, 254, 255, 266, 154; 364/413.14, 413.15, 413.16, 413.17, 413.18, 413.19, 413.2, 413.21, 413.22, 413.23, 413.24; 378/4–27, 11, 13, 7; 250/363.04, 363.05; 356/9, 12, 13; 395/118, 119, 120; 128/653.1

[56] References Cited

U.S. PATENT DOCUMENTS 4,720,843  1/1988  Haaker et al. .................... 378/98.12

OTHER PUBLICATIONS

N. Srinivasa, K.R. Ramakrishnan, and K. Rajgopal, "Detection of Edges from Projections", IEEE Trans. Med. Imaging, vol. 11, pp. 76–80, 1992.

G.T. Herman, Image Reconstruction from Projections, Academic Press, pp. 8.10–11.26–32.108–117, 1980.

*Primary Examiner*—Michael T. Razavi
*Assistant Examiner*—Marc Bobys
*Attorney, Agent, or Firm*—Intellectual Property Group of Pillsbury Madison & Sutro LLP

[57] ABSTRACT

A method for imaging or reconstructing an image of an object includes the following steps: obtaining multiple original views of the object, each original view being obtained at a different relative orientation of the object from each other view; combining the multiple original views, in an image plane to obtain a first composite image; phase inverting the first composite image to obtain a phase inverted composite image; combining the phase inverted composite image with each original view to obtain a second composite image; determining a differential between the second composite image and each original view to obtain a plurality of differentials; applying the plurality of differentials to the second composite image to obtain a resulting composite image; and optionally amplifying the resulting composite image to obtain a reconstructed image. Apparatus for carrying out the method may use analog circuitry, a high speed computer or a combination of analog and digital techniques may be used.

40 Claims, 12 Drawing Sheets

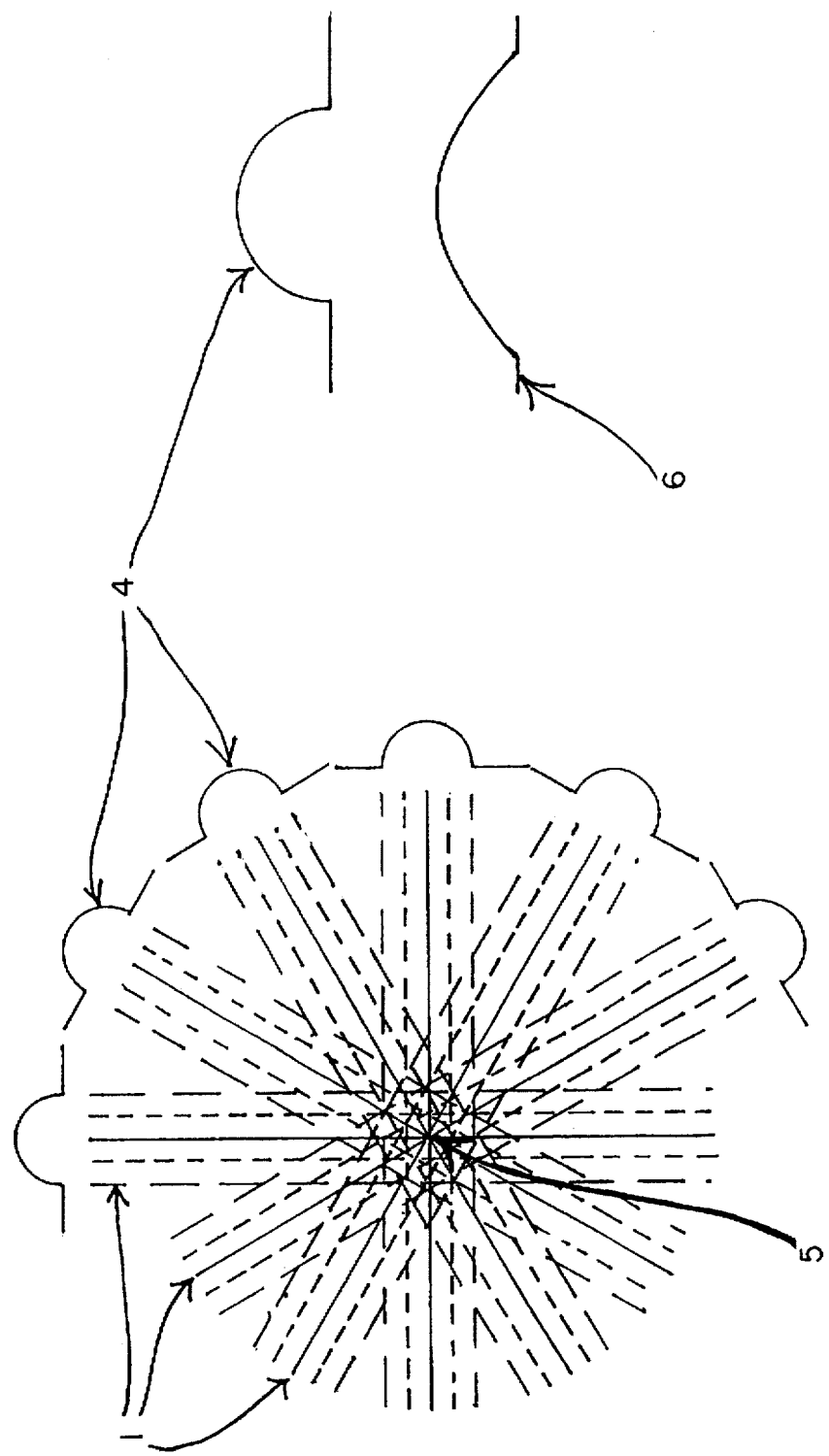

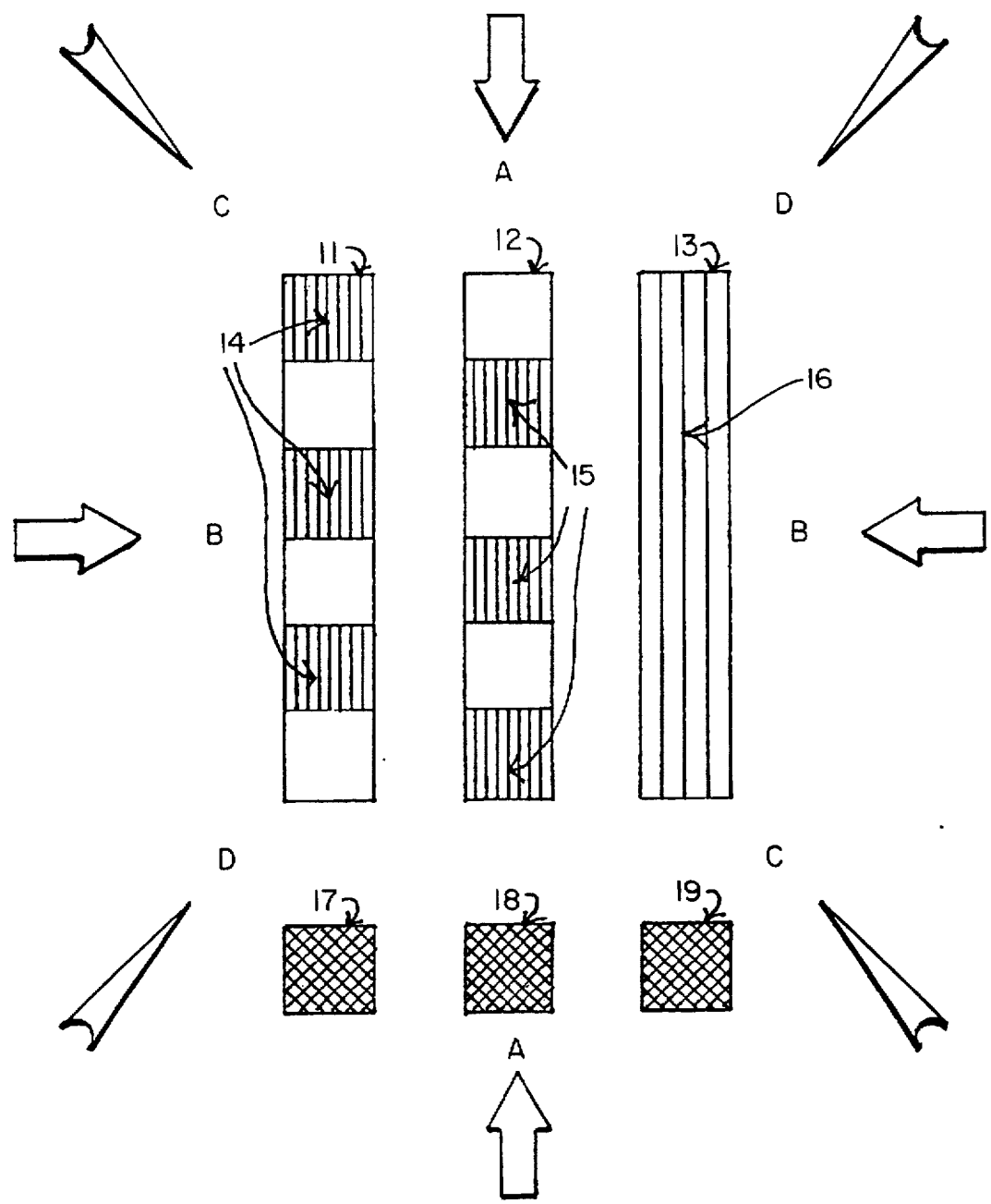

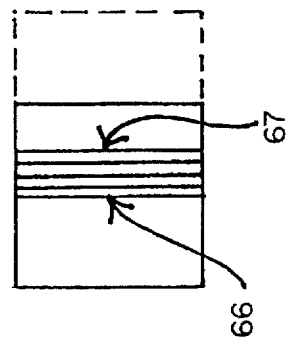
FIG. 8D
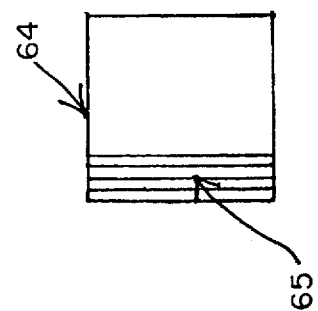
FIG. 8C
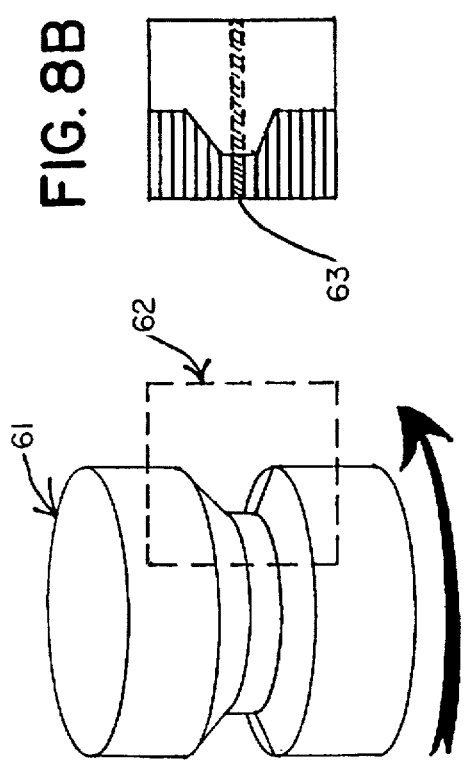
FIG. 8B
FIG. 8A
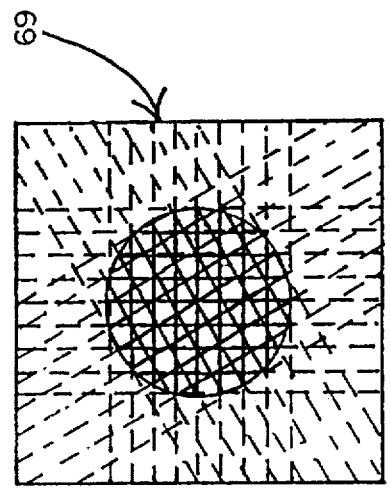
FIG. 8F
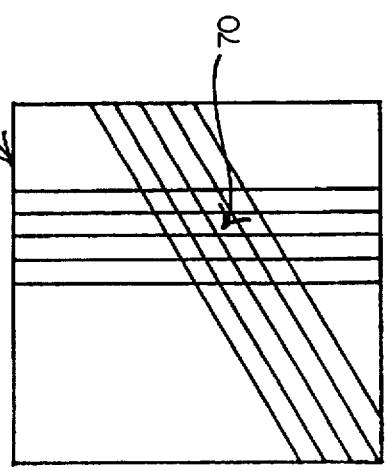
FIG. 8E

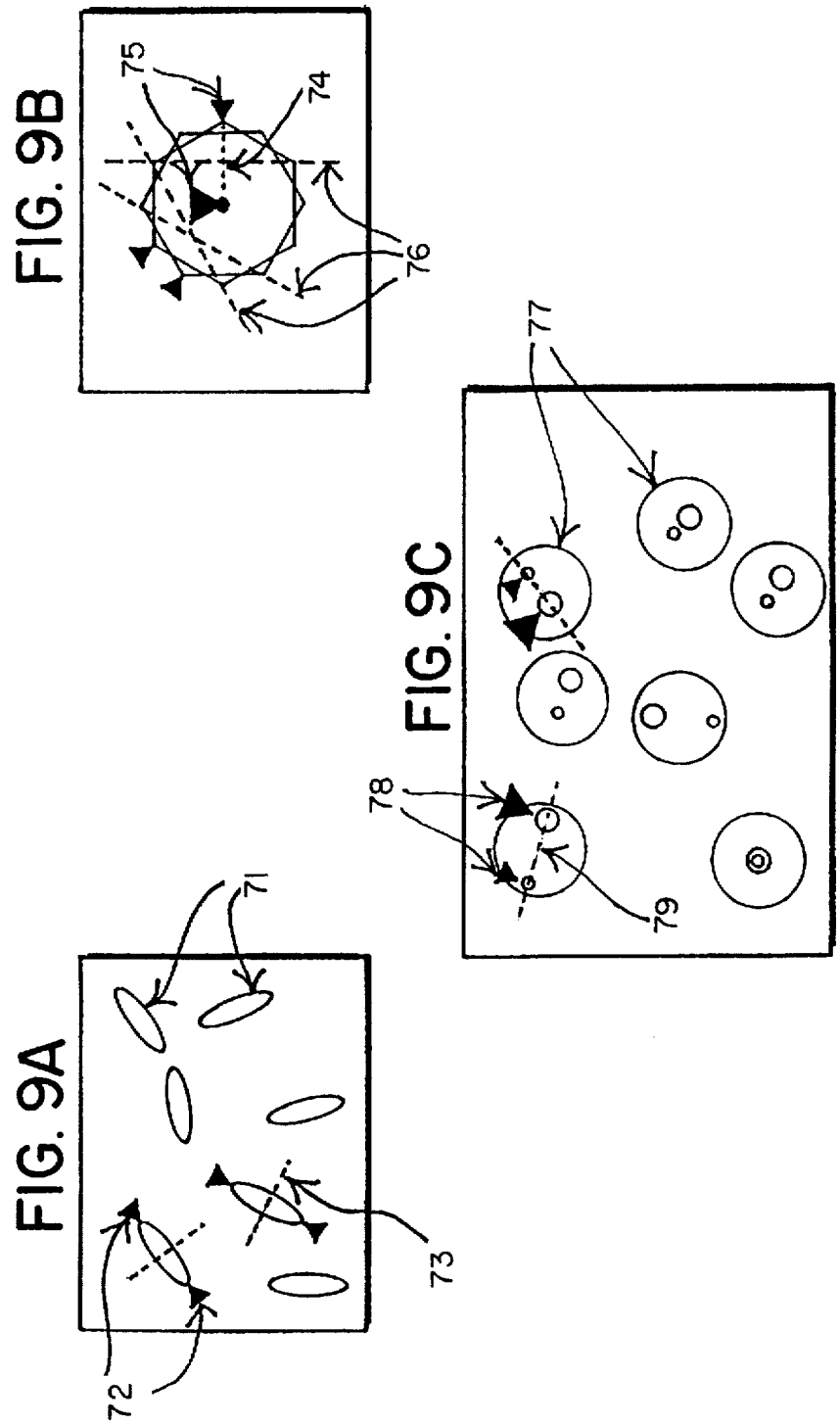

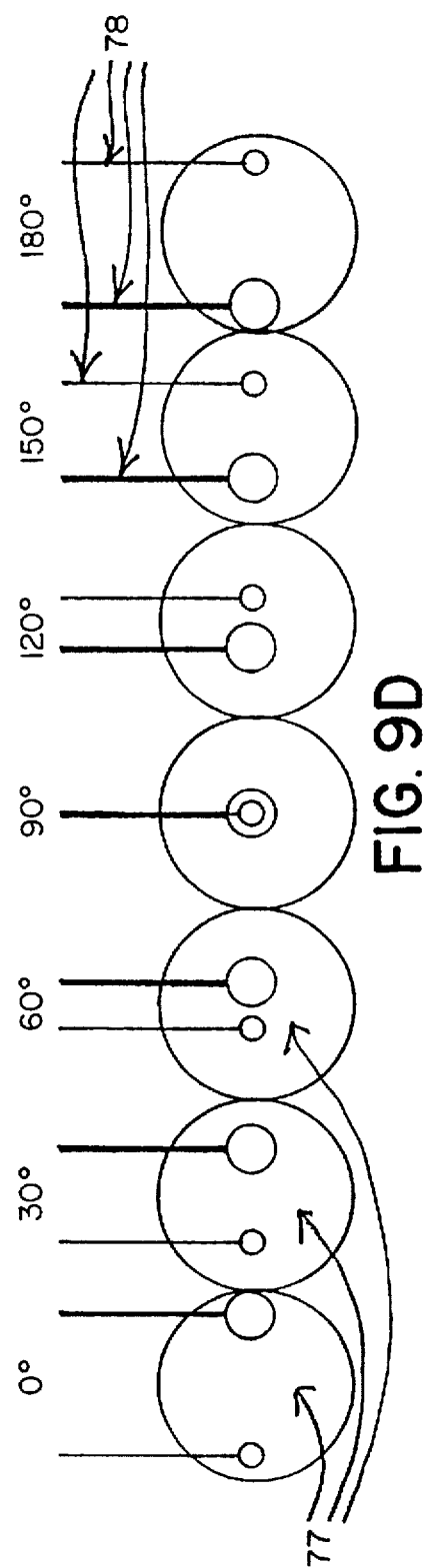

METHOD AND APPARATUS FOR TOMOGRAPHIC IMAGING AND IMAGE RECONSTRUCTION USING RECOMBINANT TRANSVERSE PHASE DIFFERENTIALS

FIELD OF THE INVENTION

The invention relates to tomographic imaging and image reconstruction using recombinant transverse phase differentials.

BACKGROUND OF THE INVENTION

Imaging and image reconstruction from projections has become a mature and well-developed art, essential to such established technologies as computerized axial tomography and magnetic resonance imaging. The common element of all tomographic imaging techniques is that multiple views of an object of interest are collected and then combined in an image plane; the combination of the views yields information about the object (such as a cross-section "slice" or "tomogram") which would not otherwise be obtainable from a single view. The arrays of data in the views are called "projections" when they are brought together to form an image. In a common arrangement, each data element (for example, a "pixel" is a data element of a computer generated array on a CRT) from each view array is converted into a "ray" line retaining the value of the data element along the length of the line. Each projection is therefore composed of rays which are backprojected over the image plane. The superimposed combination of rays from the multiple projection angles of the individual views forms the image reconstruction.

Such a typical arrangement is found in the simplified illustration of FIG. 1, where rays, such as X-rays (1), are shown passing through a symmetrical object of interest (2) and received by a linear array of detectors (3), each of which registers a value proportional to the amount of radiation received, the data values obtained from the detectors (3) producing a waveform (4).

FIG. 2 shows this same arrangement at a different angle, producing a different view. Views are conventionally produced at one-degree intervals over an arc of 180°. Other intervals may also be used.

In FIG. 3, a single image plane has been selected and the data values of waveforms of images taken at regular intervals in a 360° arc in this image plane have been converted into rays (1) which are backprojected across the image plane, each ray line retaining a constant value along its length. The rays (1) reproducing the waveforms (4) are seen to intersect, producing a crude transaxial image reconstruction (5) of the original object. The reconstruction is crude and blurred because, in the reconstruction process, the sharply defined waveform (4) has been degenerated into a poor approximation (6) of the waveform of the original object.

While it is thus tempting to consider that all of the projection rays might simply be combined to form an image, it is easily seen that such a simple combination yields a blurred, useless image, such as shown in approximation (6). The reason that simple combination of projection rays produces a blurred image is because each projection ray is actually a ray integral; their combination therefore produces an integral of integrals or "blur of blurs." Any sharp point in the original object becomes a fuzzy smudge in the reconstruction because the projected views continue past their areas of convergence. This so-called "point-spread phenomenon" has heretofore been the universal bane of all image reconstruction techniques. The result is that the reconstructed image has a lower spacial frequency content or bandpass than the projections which created it. ("Spacial frequency" is the term used to describe effective image resolution or how clearly rapid changes in the image are depicted. A blurred image is therefore said to have low spacial frequency content, while a clear image with many fine details and crisp edges can be said to have high spacial frequency content).

From the very earliest theoretical work in the field it was speculated that an infinite number of rays from an infinite number of projections ought to yield infinitely better images. Of course, something less than infinite had to be found suitable for the idea to become a practical reality. Hence, image reconstruction techniques for plentiful finite data were developed.

Very early on two very different approaches to image reconstruction emerged. Though often couched under the guise of many technical variants, images are conventionally reconstructed from projections either by the "algebraic reconstruction technique" or by the "filtered backprojection technique." It is important to understand the necessity for reconstruction techniques and the distinctions between them.

The algebraic reconstruction technique ("ART") attempts to resolve the reconstruction problem by viewing the multiple ray projections as vast sets of equations which must be sequentially solved by attempting to adjust the image data until they agree with the data in each projection data set. In brief, this method is rarely used because it is slow even to achieve an approximate result owing to the fact that adjustments corresponding to one projection view affect each other projection view and render all of the others wrong; the process must be repeated until some agreement is obtained. If the process continues, the image will drift away from its optimum result, which, at best, is only marginally adequate.

The filtered backprojection technique (and the Fourier methods which it embodies and to which it is ultimately equivalent) is the most widely used conventional method of image reconstruction. Filtered backprojection applies a high-frequency bandpass filter to the projection rays before they are backprojected, and the image appears less blurred because each projection view contains less low-frequency information. The filtered backprojection technique "sees" high-frequency edges of objects from many views; each successive projection view is expected to increase the clarity of the image by making another increment of the edge more visible. However, this means that there must be a large number of precise, evenly-spaced, contiguous projection view angles, each containing many projection rays, in order to clearly define spacial areas. Unfortunately, this process also generates considerable noise and increases reconstruction artifacts, quickly deteriorating images which could potentially contain many fine details. Therefore, intensive computation and noise suppression techniques (which suppress details) are then required to process the large amount of closely matched data. If the projection views originate from X-rays, for example, a characteristically high radiation dose must be delivered to many carefully matched detectors from rigidly controlled machine geometry or the images will be senseless or so riddled with artifacts that they will be useless. Because the images must be produced under such confined conditions, their utility is often very limited, and the process is not adaptable to a wide variety of investigative or diagnostic circumstances and requirements. If the object (or patient) is peculiarly positioned, or too large, or too unwieldy to be precisely placed in the apparatus, or cannot be viewed from the exact angular requirements, then the image either cannot be reconstructed at all or the image is not suitable for its intended purpose, as is often the case with radiation therapy planning or industrial examination, for example.

Those skilled in the art will recognize that filtered backprojection is an inadequate remedy for the problem of reconstructing clear and precise tomographic images. It is well-known that no filter can be ideal for all frequencies; filters are inherently frequency selective, yet they are indigenous and essential to the filtered backprojection process. Complex images with a broad range of frequencies are always compromised by this process.

It will be remembered that each data element of each projection ray projected across the image plane has the same value; that value is the integral of the attenuation (or additive) values which produced it. No amount of scrutiny, examination, or filtration can yield any additional information about a single ray, for all we can know from a single projection view is the ultimate value of the ray, not how it came to be that way as it passed through or interacted with the original object; we can know the final value of the line projected across the image, but we have no information about where changes occurred along the line to contribute to its final value. This problem is illustrated in FIG. 4 where three objects are shown (11), (12), and (13); the arbitrary attenuation values shown (14), (15), and (16) produce the same integral value (17), (18), and (19) for all three objects when viewed in the directions of the arrows (A—A), yet the objects are all obviously very different. More views are required, as, for example, from the directions of arrows (B-B) in order to begin to distinguish between the objects. Although the objects will appear to have identical values from this view as well, the values will differ from those of directions (A-A). Similarly, when rays from other projection view angles are added in the image reconstruction process, as from directions (C—C) and (D—D), it is with the expectation that two-dimensional information will develop in a comprehensible fashion, but, as has been explained, the very combination of rays produces reconstruction difficulties and conventionally reconstructed complex images may actually degenerate with additional data.

This is the fundamental problem of image reconstruction from projections, for what is needed is a method of image reconstruction which reproduces where and to what extent the ray integrals underwent changes in the original object from which the data was obtained while still retaining correct values of the ray integrals. This invention provides such a method.

PRIOR ART

Known prior art describes methods of image reconstruction in which the reconstruction reduces the amount of information which has been acquired in order to present a somewhat clear reconstruction of the image in a relatively short time. Such prior art methods cannot be faithful to the total of the original information as valuable information is discarded before image reconstruction takes place.

Takiguchi, U.S. Pat. No. 5,029,221 compares reconstructed image data and projection data with the goal of reducing processing time. Modulation of incident radiation and reiterative reconstruction is used after the image has been captured. Haaker, U.S. Pat. No. 5,022,066 also does not describe use of phase inversion in reiterative image reconstruction. Crawford, U.S. Pat. No. 4,626,991 describes a method for reprojecting images acquired by backprojection.

Kondo et al, U.S. Pat. No. 5,055,789 describes image reconstruction in a magnetic resonance imaging system using positive and negative time phases.

Other known references, generally related to the field are U.S. Pat. Nos. 5,311,428; 5,253,170; 5,243,664; 5,210,688; 5,204,919; 5,081,692; 5,031,620; 5,027,422; 4,979,222; 4,947,120; 4,698,689; 4,598,369; 4,495,645 and 4,228,505.

None of these patents solve the problem as described herein using phase inversion for processing the information to provide an accurate and rapid image reconstruction.

SUMMARY OF THE INVENTION

A new method and apparatus for the creation of images has been invented which provides highly accurate, richly detailed, high-speed image reconstruction applicable to a wide variety of situations and circumstances, and which provides new methods of image reconstruction.

The principle of operation of the invention is to produce a series of differentials derived from non-identical individual views of an object and a composite made from those individual views; the differentials are then combined, and this combination is used to replace the original composite image to provide a transverse-phase differential transform reconstruction. The individual views used in this invention may be comprised either of ordinary two-dimensional images, or they may be comprised of back-projected ray integrals. When the differential transform reconstruction is further recombined with projections made from the original views, interrogative feedback maintains each projected ray sum while the intensity values of individual data elements along each ray are configured to reproduce where and to what extent the ray integrals underwent changes caused by interaction with the original object.

Apparatus for carrying out the method described may be any imaging equipment using an appropriate energy source; an appropriate energy source is one which can be modulated by the object being viewed and to which the imaging equipment responds. Such appropriate energy sources includes X-rays, visible light rays, non-visible light rays, ultrasound waves, acoustic waves, radio waves, coherent light waves, and modulated magnetic fields. Apparatus for obtaining and processing the data may be a high speed digital computer or may be conventional analog equipment and circuitry using differential amplifiers or a combination of digital and analog equipment.

A method for reconstructing an image of an object may include the following steps:

(a) obtaining multiple original views of the object, each original view being obtained at a different relative orientation of the object from each other view; for example, if the object were at the radial center of an arc and the multiple original views of the object were obtained from various positions along the arc;

(b) combining the multiple original views by aligning all of the original views, adding the intensity values of all corresponding data elements, and averaging the intensity sums for each data element to provide the intensity values for the data elements which comprise the first composite image;

(c) phase inverting the first composite image to obtain a phase inverted composite image in which white image elements tend to black, black elements tend to white, and the intermediate gray scale elements tend to be relatively as near the black end of the scale as they were to the white end of the scale before the image was phase inverted;

(d) determining a differential between the phase inverted composite image and each original view by combining the phase inverted composite image with each original view to obtain a plurality of differentials;

(e) combining the plurality of differentials to obtain a new composite image;

The new composite image resulting from step (e) is preferably, but not essentially, amplified to obtain a reconstructed image. The method may further include phase inverting the reconstructed image to obtain a reconstructed image in phase with the original views.

While the method is described as including phase inversion of the first composite image, the phase inversion is only required to be relative between the multiple original views and the first composite image. Thus, equally well, the multiple original views may be phase inverted and the phase of the composite image may remain as the original phase.

The multiple original views of the object are preferably obtained using an energy source selected from X-rays, visible light rays, non-visible light rays, ultrasound waves, acoustic waves, radio waves, coherent light waves, and modulated magnetic fields. The data may be obtained and processed using a digital computer or using analog techniques and apparatus or using a combination of analog and digital techniques and apparatus.

The following steps may also be included before combining the multiple views (when each view is comprised of more than one section): selecting a section of one of the original views obtained in step (a), the section having a plurality of data elements along its length, each data element having an intensity value; selecting a corresponding section from each of the other original views obtained in step (a), each corresponding section having a plurality of data elements along its length, each data element having an intensity value; and backprojecting the intensity values of each of the data elements in each original view, wherein each backprojected data element forms a ray having multiple data elements of the same intensity value along its length, while maintaining the relative orientation of each section to each other section, wherein an array of the rays of each section are the views which are combined in step (b).

Determining the differentials in step (d) may include the following steps: summing the intensity values of the multiple data elements in each ray projected from the selected section of each original view to form a multiplicity of ray sums; summing the intensity values of the multiple data elements in each ray of the transverse phase composite image corresponding in orientation to each ray from each original view; obtaining a differential between each ray sum for each original view and the corresponding ray sum for the phase inverted composite image, and obtaining an average differential amount per ray data element by dividing the ray sum differential by the number of data elements in the ray. Applying the plurality of differentials may include simultaneously adjusting in the composite image, the intensity value of each data element in each ray of each original view by the amount of the differential per data element for each ray which passes through that data element resulting in intensity value amplitude reduction. Steps may be repeated as desired (but not to the point that the image is extinguished) before the amplifying step. The composite differential transform may then also be returned to original phase, interrogation may be undertaken again until data element intensity values are substantially steady, and then the amplifying step may be performed.

In one embodiment, a selected section is a single line of data elements and the method comprises combining the multiple original views along this line. Alternatively, the selected section may be a slice including a plurality of single lines of data elements and the method then includes averaging values of corresponding data elements for the plurality of single lines to obtain a line having an averaged value for each data element and the method further includes combining the multiple original views along the obtained line.

In another embodiment, steps (d) and (e) can be carried out on a selected portion of a reconstructed image.

The image may be of a body of a person or animal or of an inanimate object.

Apparatus useful in practising the invention is also described and illustrated.

BRIEF DESCRIPTION OF THE FIGURES

FIG. 3 is a schematic composite of backprojected views of FIGS. 1 and 2 showing the reconstruction which has degenerated into an approximation.

FIG. 4 is a schematic view of three objects when viewed from different directions.

FIG. 8 is a schematic view of reconstruction of an image.

FIGS. 9A, 9B, 9C and 9D are schematic views of reconstruction of images of many similar objects having witness marks.

DETAILED DESCRIPTION OF THE PREFERRED EMBODIMENTS

Figure 2:
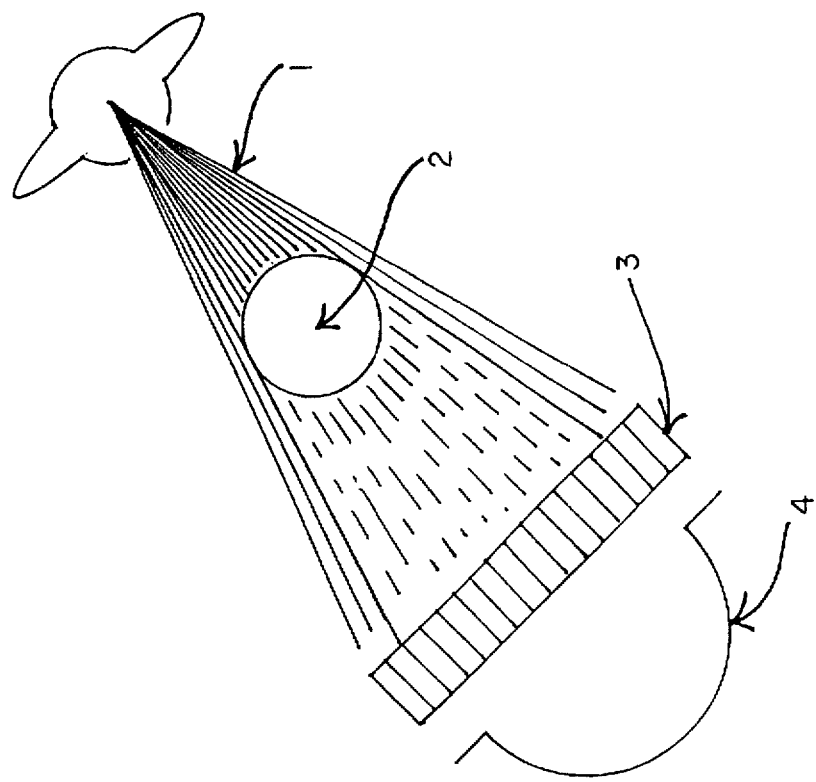
FIG. 2 is a schematic view of rays passing through an object at a different angle from that of FIG. 1, and received by a linear array of detectors wherein the detectors produce a waveform.

In one embodiment, this method is easily accomplished with the aid of a modern, high-speed digital computer. The images referred to in the method are the arrays of data which evolve from the reconstruction process and which may be made available for observation on the computer monitor or other viewing device. Filters, convolution, or other operators may be applied at any time to any of the data sets or images and may be helpful to speed up the process or to enhance the images, but they are not required. Similarly, repetition or elimination of some steps may be beneficial, depending upon the type and quality of the projection data and the mathematical operation of the computer. In another embodiment, the method is accomplished using analog methods to provide similar results.

One general process using a digital computer is as follows:

1. Using an energy source modulated by the object to be viewed and using imaging equipment which responds to the energy source, multiple original views of an object are acquired, each view being obtained at a different relative orientation of the object from each other view.
2. The multiple views are combined in an image plane to form a first composite image of the object.
3. The image is interrogated from the direction of each original view ray used to produce the reconstructed image in order to determine the differences between the original ray sums (the ray integrals which reconstructed the image) and the ray sums extracted by interrogation from the reconstructed image. Interrogation produces an extracted ray sum by adding together all of the values in the reconstructed image which lie along the path of the original ray integral.
4. The differences between each extracted ray sum and the corresponding original ray sum are simultaneously applied to the image.

Steps 3 and 4 serve only to assure high quality of the initial reconstruction (step 2) and may be eliminated if the initial reconstruction is satisfactory.

5. The relative phase of the image and projections is inverted (phase inversion).
6. The image is interrogated from the direction of each ray to determine the differences between the original ray sums and the ray sums extracted from the inverted image by interrogation.
7. The differences between each original ray sum and each extracted ray sum are simultaneously applied to the inverted image, thus producing a spacially coherent differential transform image.

Steps 6 and 7 may be repeated and the differential transform amplified as desired to bring out some particular image details.

8. The phase of the differential transform image is again inverted (restored to phase adding) and amplified.
9. The image is again interrogated from the direction of each ray to determine the differences between the original ray sums and the extracted ray sums from the image.
10. The differences between each original ray sum and each extracted ray sum are simultaneously applied to the highly-detailed, extremely accurate coherent image which emerges. The spacial constitution of the ray integrals will be seen correctly redistributed, and the image may be amplified or otherwise processed as desired.

In order to fully understand this new process of image reconstruction it is essential to appreciate that the projection data sets (the views) will always have frequency bandpass characteristics which differ from the frequency bandpass characteristics of the reconstructed image because the reconstructed image integrates all of the views into one and generally creates a blurry image. As has been explained, this blurry reconstruction has heretofore been universally regarded as a nuisance. However, when the reconstructed image and projections are of opposing phase and combined in the method of this new invention, this reconstruction phenomenon emerges as extremely useful, because the effect of the reconstructed phase transversal is to contribute the high spacial frequencies of the projections to the lower spacial frequencies of the composite reconstructed image to produce the novel differential transform vital to this process. Actual mathematical subtraction certainly may be used, with the results of greatly expanded dynamic range (which may be desirable with some images) but this is generally much more computer intensive since the data sets must be repeatedly normalized. Because the differential transform is created from projected data and image data of opposing phase, it might be supposed that they would simply cancel each other out and, indeed, the differential transform image may appear to be driven to virtual extinction as the amplitude decreases (especially if data of opposing phase is repeatedly applied to the inverted image—steps 6 and 7 above). However, when the differential transform image is amplified, it turns out that the image has been transformed into a rich vector map including high-frequency transitions. When the phase is again inverted and combined with the original ray integrals (or the image produced from them), the differential transform elegantly restores voluminous high-frequency details to the reconstructed image by reconfiguring the values along the integrals, thus "instructing" the image how to assemble correctly. In addition, unlike images produced by the filtered backprojection technique, the reconstructed image will be found remarkably free of reconstruction artifacts because opposing phase transversal tends to cancel otherwise additive artifacts.

Figure 1:
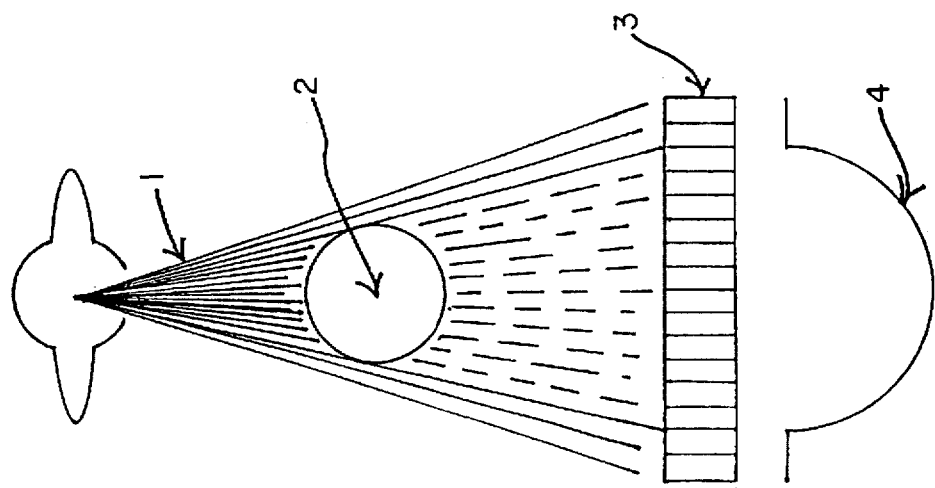
FIG. 1 is a schematic view of rays being passed through an object and being received by a linear array of detectors, wherein values of the rays received by the detectors produce a waveform.
Figure 5:
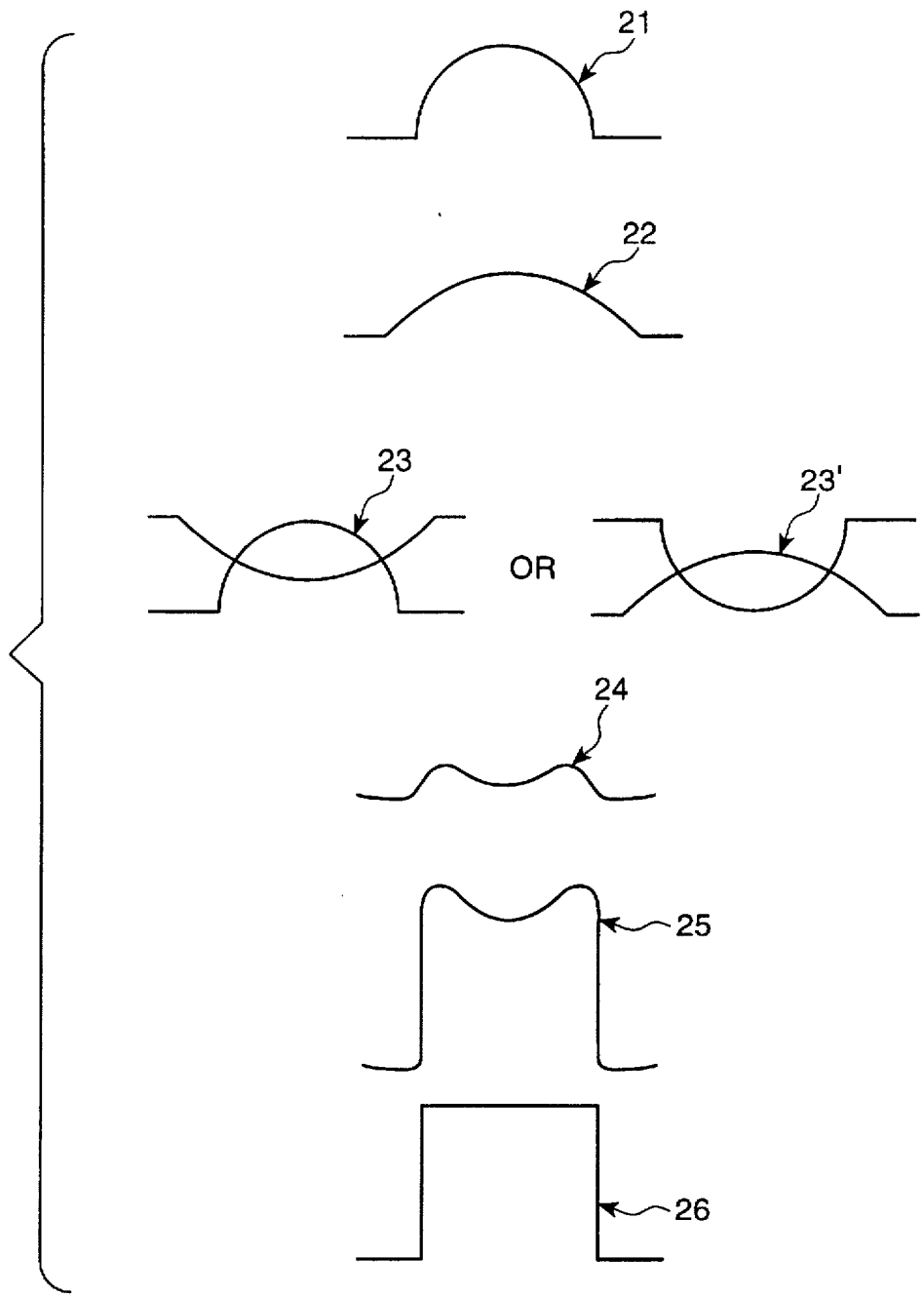
FIG. 5 is a schematic view of steps of a process of the invention showing phase inversion and recombination for reconstructing an image.

The new method is illustrated in FIG. 5, where a waveform (21) produced from an original projection view, such as is shown in FIG. 1, is combined with a composite waveform (22) of lower spacial frequency, such as might be extracted from a reconstructed image formed of a composite of multiple original projection views, such as is shown in FIG. 3. After the phase of the composite waveform (22) has been inverted, the original waveform (21) and the composite waveform of opposite phase are combined (23) to produce a differential (24) which, when amplified (25), produces a waveform perfectly suited to reproduce the sharp edges of the object. It will be apparent that the same result will be achieved whether the composite waveform (22) is inverted or whether the multiple original views (21) are inverted. In each case the wave form (21) is combined with the composite waveform of opposite phase (23) or (23'). Amplified differentials similarly produced from each other original view and the composite image are combined, ultimately producing the ideal waveform (26). This step of combining each original view and a composite image of opposite phase is repeated as necessary until the ideal waveform (26) is as nearly perfect as is desired for the application for which the method is being used. It will be observed that the curved edges of the original waveforms have disappeared during the course of this process. The waveforms in this illustration are actual reproductions from the method as applied to the reconstruction of a circular object of uniform density; the edges of the waveforms are initially curved because the path of a ray is shorter through the edges of the object than through the center. While this accurately reflects the integral pathway, conventional image reconstruction from such waveforms would have the object appear as though it had graduated density; this is the reason conventional image reconstruction techniques are rarely quantitatively useful. It is important to recognize that only the straightened edges of the waveforms emerging from this new method accurately reproduce the characteristics of the actual object.

It will be noted that the images which emerge from this new process are formed with constant reference to the original data set of ray sums and the differences are applied to the images simultaneously (the reconstructed image is not corrected until it has been interrogated from all projection angles), thereby avoiding the cumulative integration which necessarily plagues the sequential ART technique. The ART technique relies upon sequential correction of one view compounded upon corrections to all the other views to continuously "refine" the image. Because the ray sums can never all be in agreement at the same time, the characteristic ART dilemma is when to stop the process, for it is not possible to know when (or if) the image is correct.

The method of this new invention, in distinction to the ART technique, applies adjustments to the image simultaneously; the extracted ray sums are always brought into agreement with the original ray sums at the same time. This stringent feedback mechanism assures that the image is not corrupted by deviation from the original data which created it. The development of spacial details and contrast are directed by the differential transform which controls the distribution of values within the ray integrals while interrogative feedback prevents disturbance of their ultimate relative sums.

It is similarly important to note that the method of this new invention does not require the high data density and large number of views of the filtered backprojection technique because image reconstruction is no longer solely dependent upon fractionated edge increments. While images should always be constructed with as much high quality data as possible, neither large numbers of views nor large numbers of ray integrals are essential to this new reconstruction process because undersampling "streak" artifacts, a frequent problem with other techniques, are not readily reinforced by phase transversal.

In general, images will begin to be optimally reconstructed when the number of combined data elements from diverse projections is approximately equal to the number of elements within the area of the reconstructed image matrix. However, even when projection data is sparse or views irregularly spaced, this new method can uniquely be used to reconstruct a detailed image by simply confining the interrogated reconstruction area to the area of interest. In such a method only the portions of the projected integrals which cross the area of interest are combined, and only ray sums from that area are extracted. Because the reconstructed area is smaller, reconstruction will be faster. This means that objects with unusual geometries of shape, position, angularity, or large size, which are difficult or impossible to reconstruct with other techniques, can be easily accommodated. This also means that a plethora of new image acquisition and reconstruction modalities become possible, as will be more fully explained below.

Figure 6:
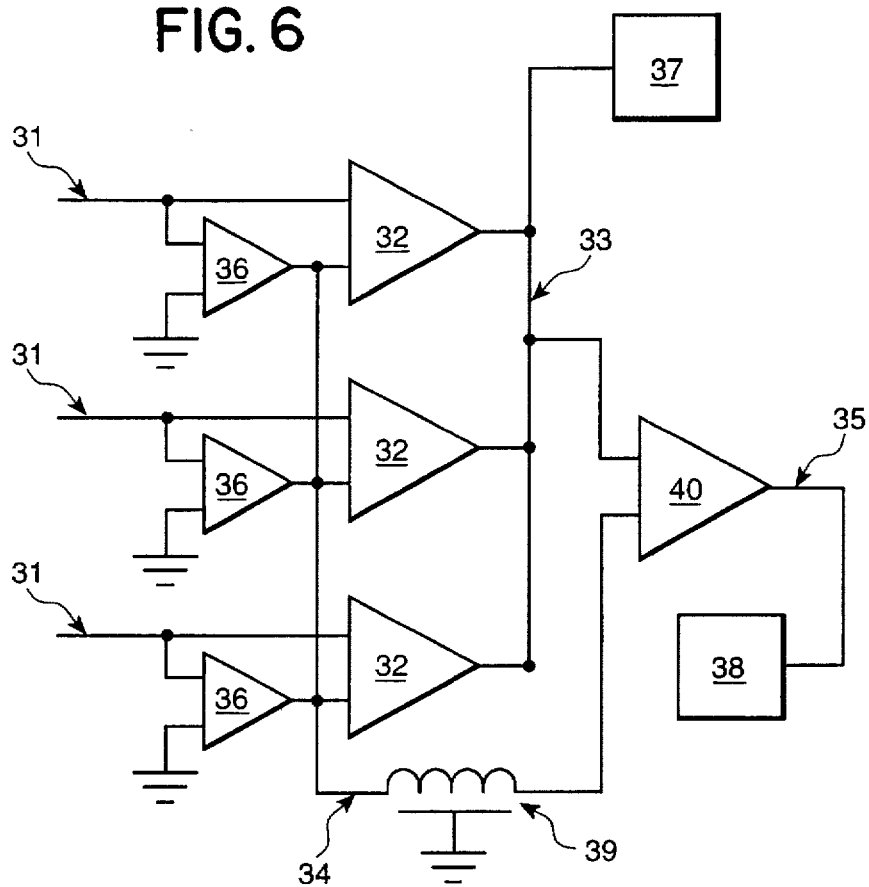
FIG. 6 is a schematic diagram of an analog system using parallel differential amplifiers to create a differential transform.

For example, referring to FIG. 6, use of this invention in a preferred high-speed analog system is illustrated; a digital computer is not required. Single original view inputs (31) from one or more video cameras, for example, are combined through isolating or buffer amplifiers (36), the outputs of which are connected in parallel to form a composite image signal (34). This composite image signal (34) is distributed to one input of each of a plurality of differential amplifiers (32) while the other input of each of the plurality of differential amplifiers (32) is fed a different original view input (31) to produce a series of differentials derived from each original view input (31) and the composite image signal (34), which differentials can be combined (33) to create a phase transversal differential transform. This differential transform may be viewed on a suitable viewing device, such as a television monitor (37), or it may be recombined with the original composite image (34) through another differential amplifier (40) to produce yet another extremely accurate real-time differential transform reconstructed image output (35) which can also be viewed on a suitable viewing device (38).

It will therefore be seen that the differential amplifiers (32) can be configured to form a cascade of virtually any length. The differential outputs of the differential amplifiers (32), when combined (33), become one input to another differential amplifier (40), which then outputs a new, more refined image signal (35). This signal may become one input of yet another differential amplifier, the other input of which is formed by composite (33) or (34), producing yet another improved image signal—and so on as outputs become inputs to successive stages, in cascade fashion.

Conventional amplifier design is perfectly suitable for use with this invention, including, for example, the use of variable or fixed negative feedback for the control of gain and frequency response. Similarly, variable or fixed delay lines may be variously incorporated as at (39), for example, to insure that differential transform signals and composite or earlier transform signals arrive at the inputs of successive stages in proper time relationship to produce the desired composite image or differential amplifier output.

Differential amplifiers are distinguished by the fact that they produce an output only when there is a difference between the inputs. When the amplifiers can no longer amplify the difference between the inputs, no output signal will be produced and further amplification by additional cascade stages producing more detailed further phase transversal differential transforms is not possible, although, of course, signals may be simply amplified to increase image contrast for viewing or for other image processing purposes.

Figure 6A:
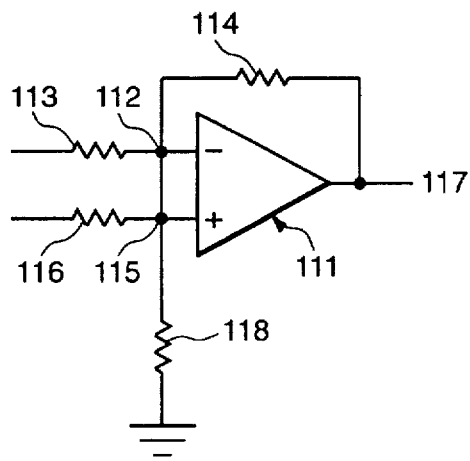
FIG. 6A is a schematic diagram of a detail of the analog system shown in FIG. 6.

A typical basic type of differential amplifier stage, such as (32) or (40) of FIG. 6, suitable for use with this invention is shown in FIG. 6A where an operational amplifier (111) is shown with inputs (112) and (115); these inputs are usually referred to as "inverting" (marked with a minus symbol) and "non-inverting" (marked with a plus symbol) inputs. Inputs (112) and (115) are fed by balancing resistors (113) and (116). Feedback resistor (114) returns the output of the amplifier (117) to the inverting input (112) and thereby provides negative feedback to control gain and stabilize the amplifier which would otherwise quickly saturate and become useless. Resistor (118) forms a voltage divider with resistor (116) and provides an input path to ground.

Figure 6B:
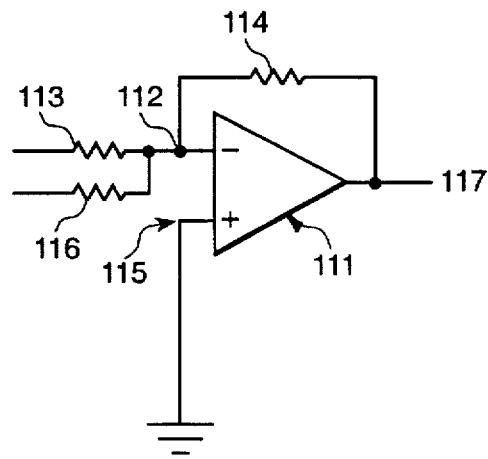
FIG. 6B is a schematic diagram of a variation of FIG. 6A.

When signals are to be isolated, amplified or combined for viewing (as when it is desired to combine differential transform composite (33) with original composite (34) of FIG. 6, or simply to amplify the output of a differential stage, such as (32) or (40) of FIG. 6, then the amplifier stage of FIG. 6B is typical of suitable basic circuits. As in the previous illustration, the negative feedback resistor (114) returns the output (117) of the amplifier (111) to the inverting input (112), thereby controlling gain and frequency response characteristics (amplifiers tend to exhibit improved frequency response with lower noise and distortion when the gain is reduced with negative feedback.) Resistors (113) and (116), which may be fed by signals (33) and (34) of FIG. 6, for example, serve to adjustably weigh how the image signals will combine and whether one or the other will predominate when combined. Since no differential output is required in this configuration, the other amplifier input (115)

is at ground. If feedback resistor (114) is replaced by a direct connection between the output (116) and the inverting input (112), then the amplifier gain is reduced to unity and the amplifier becomes an isolation or buffer amplifier, as at (36) in FIG. 6, when signals are input to the non-inverting input (115).

Those skilled in the art will quickly see that many amplifier circuits can be profitably applied to this invention; the circuits shown are simply practical application examples of the principles of the invention.

Reconstruction with this analog system is virtually instantaneous because all essential differential operations are performed in parallel. Such an analog system can therefore be used to view moving objects and changes in the object or scene will be quickly detected. This system can also be used in combination with a digital computer by preprocessing the data before it enters the computer, through an analog to digital converter. The computer can then be used to store the image data, such as (33), (34) or (35) of FIG. 6, for instant retrieval or further image manipulation, thereby considerably shortening computer operations since the digital computer is no longer used for primary image reconstruction. Such an analog system may be used with only a single input channel if synchronized, rapidly sequenced views are presented at (31) of FIG. 6, while a delayed or previously stored composite, as output from a digital computer through a digital to analog converter, for example, is introduced at (34).

Of course, feedback may be applied to any inverting input in the cascade to control gain and frequency response. Reconstruction is instantaneous because all operations are performed in parallel. Such a system can therefore be used to view moving objects and changes in the object or scene will be quickly detected. This system can also be used in combination with a digital computer by preprocessing the data before it enters the computer for further image manipulation, thereby considerably shortening computer operations.

Figure 7:
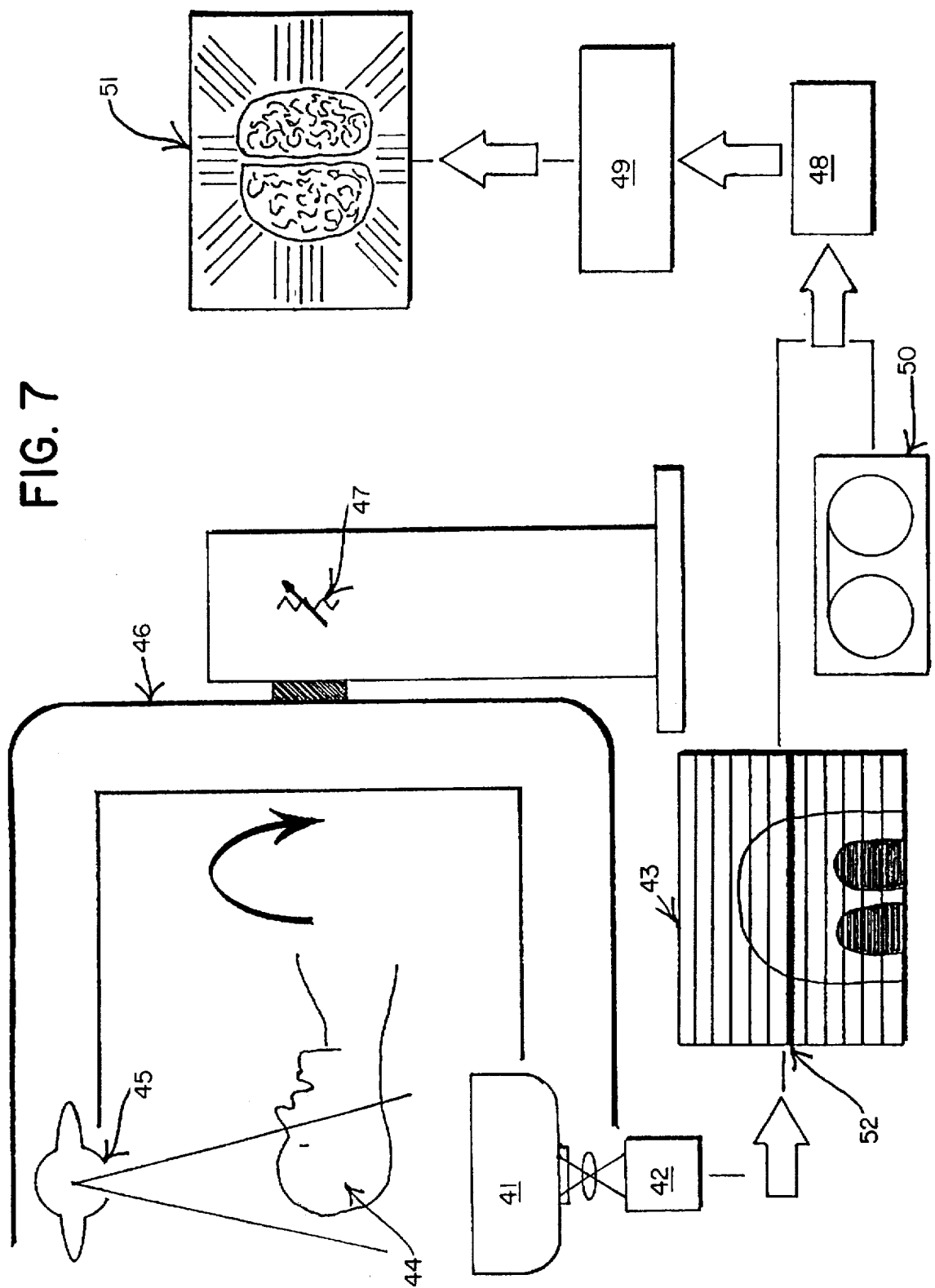
FIG. 7 is a schematic view of a typical use of the invention in which the views are acquired by means of an image intensifier coupled to a television camera.

While virtually any sort of data acquisition arrangement may be used with the method of this invention, certain apparatus has been found particularly useful, as, for example, the preferred apparatus of FIG. 7. Here the views are acquired by a television chain including an image intensifier or other spectral transducer (41) coupled to a television camera (42). Multiple such television chains may be used at multiple angles to acquire the various views, such as the one illustrated at (43), for real-time reconstruction, or the television apparatus may simply be moved around the object of interest (44) which is transilluminated by, for example, X-rays (45) (or any other energy which produces a telling image on the television apparatus), or the object of interest may be rotated within the field of the stationary image acquiring apparatus; no image intensifier is required if the energy modulated by the object is abundant and harmless, such as light). The angular position of the moving apparatus (46) can be monitored by a position transducer, such as a potentiometer (47). Views thus acquired can be immediately digitized through an analog-to-digital converter (48), stored, and promptly reconstructed in the computer (49), or they can be stored on videotape (50) for later digitization and reconstruction (51) during idle hours (the position transducer can modulate a pilot tone on the videotape).

Television is particularly useful for this invention because it renders certain reconstruction modalities singularly convenient and very rapid. Typical medical X-ray apparatus (such as a radiation therapy simulator or other "C"-arm configurations, for example) can swing through a 180° arc in less than 30 seconds. This means that data for more than 200 to 500 exquisite tomographic image reconstructions can be acquired in 30 seconds. (An NTSC television field contains 262.5 lines, a frame 525 lines; the data along each television line constitutes a projection view set of ray integrals; the same television line number taken from each angular position creates the image reconstruction when all the views are projected and combined by the reconstruction method of this invention). Using this preferred apparatus and the method of this invention, robust, richly-detailed image reconstructions have been produced with less than one percent of the radiation dose required by conventional techniques, and in much less time; this is possible because image reconstruction by the method of this new invention minimizes the noise and reconstruction artifacts which are so common to other techniques. It is also interesting to note that small movements of the object are of little detrimental consequence because the images are acquired so rapidly.

Use of the invention with a radiation therapy simulator, for example, is quite straightforward. The simulator fluoroscope is adjusted to produce a clear image on the intensifier which, depending upon the nature of the area of interest, is usually in the range of 0.5 to 50 Ma at some 50 to 70 KvP. If the AGC (automatic gain control) interferes with good soft-tissue reproduction by wildly varying X-ray tube potentials or intensifier flare, the AGC must be adjusted or switched off. The simulator is then moved through an arc of 180° which usually takes about 30 to 32 seconds for most machines. During the course of movement through the arc, the output of the intensifier television camera can be committed to videotape or fed directly to the ADC (analog-to-digital converter). A "flash" ADC configured for field or frame capture is preferred for high-speed operation. Depending upon the amount of detail required and the signal-to-noise ratio of the apparatus chain (whether the noise originates from poor modulation transfer function, ADC error, etc), it will generally be found that only 50 to 60 views will be required for VGA modes (320×200×256) although useful images have been produced with as few as 18 views. It is rarely necessary to require more than 100 views in this mode. Still fewer views are required in SVGA (640×480×256); usually between 19 and 35 views are sufficient, although, of course, any number of views can be used (ADC technology can produce several hundred images in this time period). If the simulator arm is moving at constant speed, then the images (views) are acquired at regular intervals; otherwise the output of the position transducer denotes the angle. In some cases it may be found desirable to heavily cluster views around a selected angular space to pick up some particular details in that area. In all events, care should be taken that the ADC (and the computer software) correctly align the horizontal lines of the acquired views; this is conveniently handled by a well-controlled time base. With some kinds of videotape equipment time-base correction may be desirable, although this is seldom required.

Because the television lines are so close together, it will be found that there is very little gap between tomographic slices and small details will be visible which would be missed with conventional tomographic apparatus and technique. Furthermore, the deleterious "partial-volume effect" will be inconsequential. In brief, the partial-volume effect creates serious and misleading reconstruction artifacts when high-frequency edge enhancement (filtered backprojection technique) inappropriately emphasizes low-resolution data. The closely-spaced lines of the high-resolution television acquisition in combination with the phase transversal reconstruction method of this new invention do not readily give rise to this sampling defect phenomenon. If thicker slices are useful (for fast examination of large volumes, for example) then it is only necessary to average several contiguous lines and project the average, rather than projecting the single line (52) of FIG. 7. This will yield a very accurate assessment of the relative volume importance of any detail of interest.

Multiple such television chains arranged in a stationary pattern are ideally suited for use with the analog circuit of FIG. 6 or a single channel of the analog circuit can be used with a stored (or delayed) composite image.

This television system is also perfectly suited to a new sagittal view reconstruction method because the rectilinear television image is always two-dimensional.

The method of this new invention has thus far been explained and illustrated with use of a circumnavigating linear data array. This will reconstruct a coronal image in a plane of a cross-section perpendicular to the views by superimposing ray integrals backprojected across the image plane as described. However, if the data array is already two-dimensional, as in the television system above, then the method of this invention may be used to produce a sagittal view (a cross-section in the same plane as the views). In this case, linear ray integrals are not created and then back-projected; instead, since each radiograph is already a two-dimensional array of integrals, the entire views are combined by this new method, as in this preferred embodiment, described below:

1. Multiple, non-identical, two-dimensional original views of an object are acquired, each original view being obtained at a different relative orientation of the object from each other view; for example, if the object were at the radial center of an arc and the multiple original views of the object were obtained from various positions along the arc.
2. All of the views are aligned and combined wherein the intensity values of all corresponding data elements are added to obtain a sum which is divided by the number of views to provide intensity values for the data elements which comprise the composite image, which intensity values are within the intensity range limits of the original views.
3. A series of differential transforms is produced by combining each original view with the phase inverted composite image in which white image elements tend to black, black elements tend to white, and the intermediate gray scale elements tend to be relatively as near the black end of the scale as they were to the white end of the scale before the image was inverted; or, alternatively, a series of differential transforms may be produced by subtracting each composite image data element intensity value from the corresponding data element intensity value in each original view (or the original view values may be subtracted from the composite image values).

The decision whether to produce the differential series by combining original views with an inverse phase composite image or by subtracting the composite pixel values from the corresponding original view pixel values is based on the characteristics of the data sets. Data sets with pixel values clustered toward either end of the pixel value range tend to reconstruct better using the inverse phase composite image method; those with the wide range of intensity values tend to reconstruct better with the subtraction method. Consider this illustration: two images in both of which all pixels have a value of 0 (black); combination of one (pixel value=0) with the phase inverse of the other (now with pixel value=255) would result in a gray image with pixel value=127 (0+255)/2). On the other hand, if the subtraction method were used the resultant image would have pixel value=0 (0−0=0).

4. Each differential transform can be amplified or otherwise processed as desired.
5. All of the differential transforms are combined as described in step (2) to form the exquisitely clear sagittal reconstruction which emerges. This may be further recombined with the original reconstruction if desired, or a new series of differential transforms may be created, as in step (3), and the process repeated as desired.

This phase transversal process may be repeated as desired, each repetition again producing the differential transforms which combine to reconstruct the image, until the desired image clarity has been achieved. While any number of views can be used to reconstruct sagittal images, it will often be found that fewer views are required with this method because the images may have more clarity and the depth of field may be more comprehensible when the angular space is confined to between 300 and 900, although any angular space can be used.

While it has been explained that the method of this invention can be used with virtually all sorts of data input which can constitute a view, it is also important to point out that this invention can be used to process or reprocess data from conventional techniques and apparatus and so to reveal details not originally visible. Indeed, a particularly novel and useful way of doing this is simply to digitize from film, for example, a conventional reconstruction (such as a CAT scan) and then to recalculate the integrals along the paths of the original projections. It is not necessary to recreate all 180 projection views; however, if less than the number of original projections are to be used, the best images will be obtained using a lesser interdigitating subharmonic, such as 60 or 90; similarly, while the entire original angular space does not have to be traversed, the best images will be obtained by doing so. The integrals can then be back-projected and the phase transversal differential transform technique of this invention can be used to create a vivid reconstruction, often presenting previously invisible details if the original data was not excessively corrupted by the original process.

Similarly, this invention can be used to assemble data and reconstruct coherent images from many diverse radiation sources, such as light, infrared, acoustic, and ultrasound; whether the radiation is attenuated or emitted, refracted or reflected, as long as the radiation is by any means modulated by the object of interest, a tomographic image from those combined modulation patterns will be reconstructed by this new invention. Diagnostic ultrasound, for example, is largely harmless and widely available for field use for examination of agricultural products (melons and the like) as well as for examination of large animals. Modern instruments provide a television output (such as NTSC or PAL) in addition to an on-board display. This invention will produce an image reconstruction from a television output in the manner described for television reconstruction. With very large objects, because the ultrasonic energy is usually substantially absorbed and refracted as well as reflected, it may be well to move the transducer through a full 360° in order to produce good detail. Typical large-object coronal reconstruction with a 3.5 Mhz linear array transducer may therefore produce better images with slightly higher view density (60 to 80) because ultrasound images have characteristically lower resolution and higher noise content. If a higher-frequency transducer is used, deep penetration may deceptively appear to be decreased or invisible on the ultrasound instrument display, but reconstructed image resolution will improve and fewer images may be necessary for excellent reconstruction. Should it happen that the views become misaligned during acquisition (such as might occur with hand-held field instruments), then the view images are easily brought into proper confluence by simply marking an area common to all the images and then aligning to that mark.

Conventional methods of image reconstruction project through the axial center because great amounts of largely redundant data are required to produce acceptable images; the common center of the backprojections helps to assure that at least some of the data is additive, since each individual projection contributes only a small increment to the final reconstruction. By contrast, the technique of this new invention does not require such pristine axial reconstruction because the differential transform reconfigures the integrals. This means that images can be reconstructed by virtually any scheme, so long as the projections bear the same appropriate relationship to each other when backprojected as they did when the projection views were acquired.

For example, a preferred radial technique valuable for reconstructing objects too large to be completely visualized in any single view is illustrated in FIG. 8. Here the object (61), such as a large reaction vessel or a machine which cannot be moved, is shown only partially within the field of the data acquisition array (62), such as the television chain described previously. The selected line (63) from each view (64) is converted into ray projections (65) and shifted so that the edge of the projections (66) corresponding to the part of the viewed object closest to the object center is at the center of the image reconstruction area, while the selected area of interest (67) for the object always stays visible throughout the views. When the data is backprojected with the same angular relationship with which it was acquired (68), the differential transform process of this invention will produce a perfect contour image (69), preferably from views encompassing more than 180°, since the projection data is invalid across the center of the image. Here it will be noted that the projections only combine radially (70) and therefore cannot be presumed to have substantially identical integrals 180° apart through the center of the image plane; image fidelity will then substantially improve when projection views extend beyond 180°.

Regardless of the backprojection scheme used to reconstruct the images, it is generally true that diverse projection view angles will increase image fidelity, but, with this new invention, it is not necessary that those view angles uniformly fill the angular space. Coherent, useful images will reconstruct even with gaps in the angular space, such as might occur if certain view angles were unavailable. This unusual ability is found most useful in yet another preferred embodiment illustrated in FIG. 9 where it is shown possible to reconstruct tomographic images from many virtually identical objects in a random angular pattern, as opposed to the usual arrangement where a single object is viewed from many angles at uniform intervals. Shown illustrated, for example, are optical or electron micrograph images of many similar objects of a class, such as a particular type of blood cell or microbe randomly distributed in the field, but whose characteristic properties offer some clue as to orientation. Perhaps the position of some interior structure, perhaps the very shape of the cell itself, perhaps some streak of color or irregularity—any such "witness marks" can be used to identify and then mark the angular orientation of the cell or other object of interest. A projection set of data points can then be derived to provide a view from the angle calculated by reference to the witness marks. When all the views from all the available angles are backprojected and combined using the method of this invention, the reconstructed image will be a cross-sectional view of generic objects of that type. Shown in FIG. 9A are small elongate objects (71) (seed grains, for example) and the witness marks (72) are simply the easily-identified ends of the seeds. The selected array of data points for projection (73) can then be calculated to have the same relative orientation on each seed and can be backprojected to provide the combining ray integrals.

The method of calculating the angular orientation for backprojection depends upon the nature of the objects. When examining structures within crystals, FIG. 9B, for example, the position in the field may be important for it may indicate how the structures fit together; in which case the actual angle described by an imaginary line (74) between witness marks (75) can denote the calculated view angle for the selected line of projection data (76).

More commonly, the distance (79) between witness marks can be used to determine the angle, as for the cells (77) in FIG. 9C because the witness marks (78) will come closer together as the angles become more acute. Objects in the field assuming different random degrees of rotation will indicate the amount of rotation by the separation between the fiduciary witness marks. This is illustrated in FIG. 9D, where the marked objects (77) exhibit separation between the witness marks (78) as the selected objects are shown through 180°. Other types of objects may require more than two witness marks to assure correctly identified orientation, while yet other objects appear the same in any orientation, in which case the projections can simply be uniformly distributed through the selected angular space, such as 180°. Of course, image fidelity will increase as more marked objects are added from many specimen images. The various marked objects in the field can also be combined in the manner of the sagittal view method described earlier; in this case the witness marks assure that the objects align properly.

Figure 10:
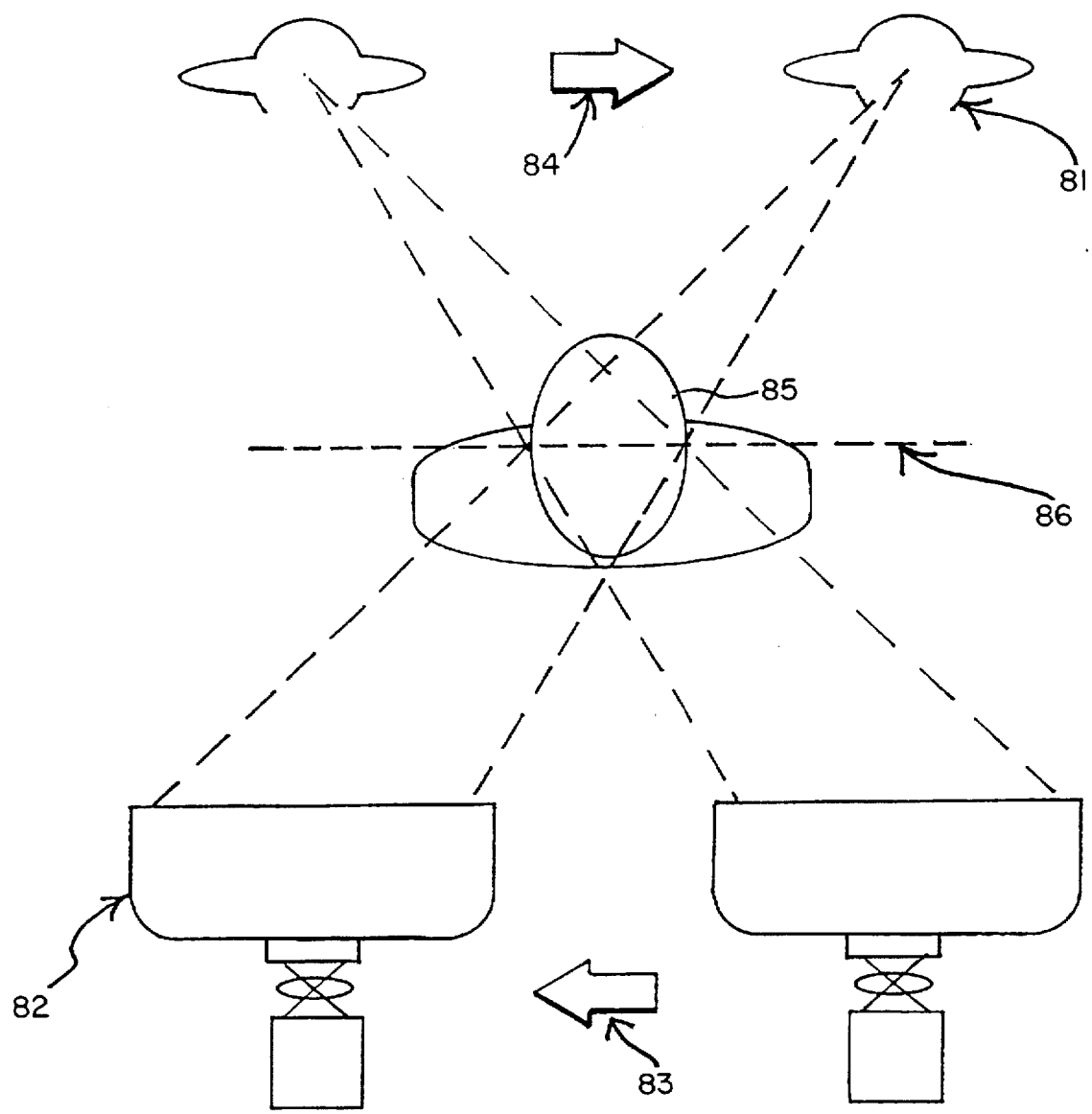
FIG. 10 is a schematic view of use of X-ray equipment which is not capable of circular movement and in which the images obtained are digitized and combined.

It should be noted that the unique reconstruction method of this invention is well-suited to many variations of lineal and random tomographic techniques. Lineal or random tomography is useful when it is only possible to acquire images or projection views from one general direction, such as above or below the object or patient. Such techniques can be employed to advantage in an emergency, for example, when the available X-ray equipment is not capable of circular movement. The general technique is illustrated in FIG. 10, where the X-ray apparatus is movable only up and down and side to side. In this case, the fluoroscope image intensifier (82) (or a cine film cassette) is moved in a direction (83) opposite to the direction (84) of the moving source of X-rays (81). Similarly, of course, the x-ray source (81) and film or intensifier apparatus (82) may remain perfectly stationary while only the object (a beating heart, for example) is in motion. Images thus acquired are then digitized and combined whole or a single television line may be backprojected following the same geometrical scheme. Using the novel phase transversal differential transform method of this invention, it will be found that a sharp area of convergence reconstruction will emerge in the areas common to all the projections (85). Changing the extent of relative movement between the source of X-rays (81) and the receptor (82) changes the crossover reconstruction plane (86). This technique is most useful for producing sagittal views since whole two-dimensional views are so easily acquired.

Figure 11:
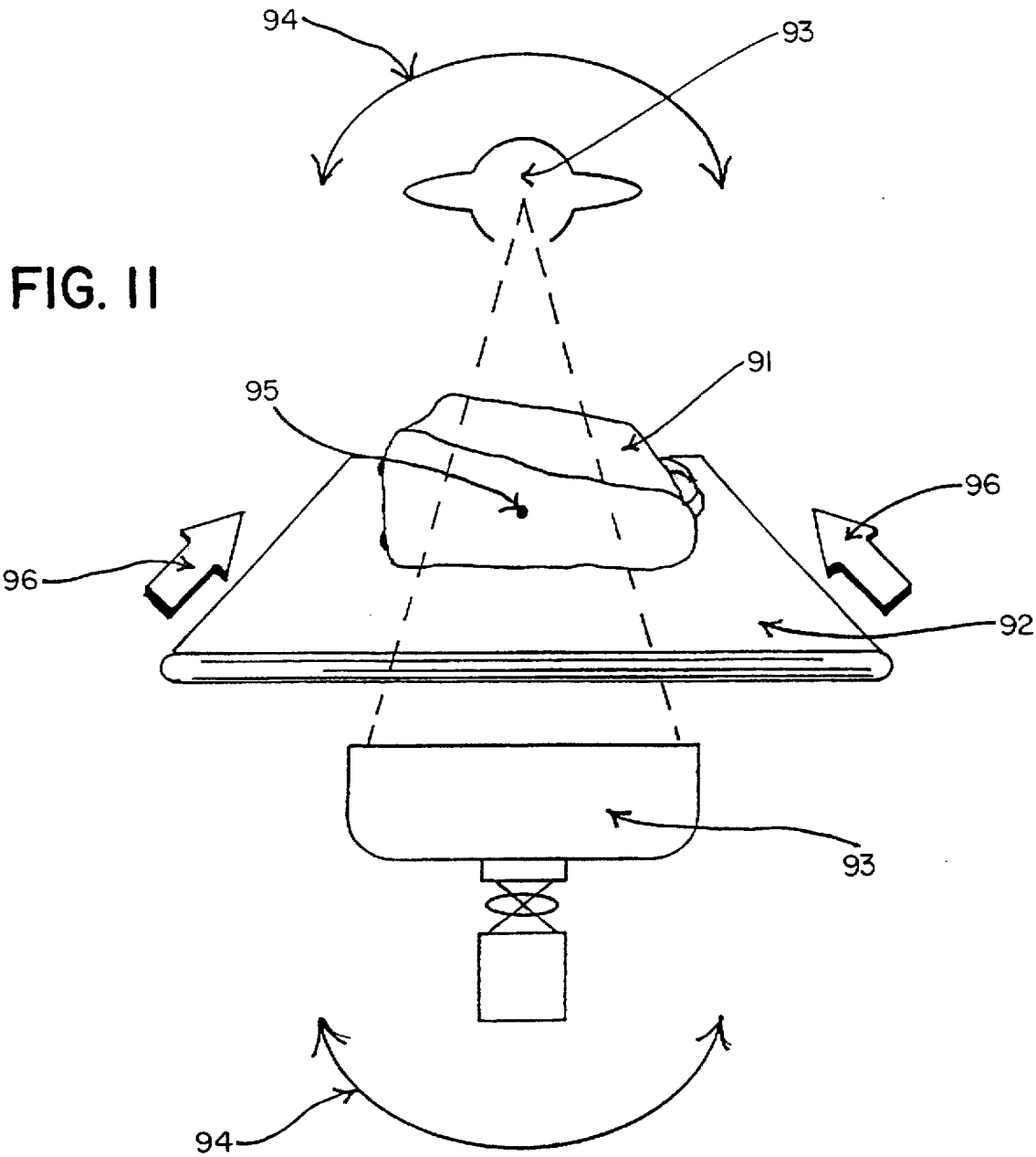
FIG. 11 is a schematic view of X-ray inspection apparatus such as is used at airports in which images of objects scanned are readily reconstructed.

Another novel application of lineal processes is shown illustrated in FIG. 11, where the object of interest may also be in motion, in this case luggage (91) on the X-ray inspection conveyor (92) found at modern airports. This entire inspection routine—the product of a day's inspection—can be videotaped and later reconstructed by this new process should the need arise to know the detailed contents of a run of luggage, or an image of the contents can be reconstructed immediately if suspicions are aroused. Extremely detailed images of the luggage contents can be quickly reconstructed because biological considerations' of radiation are of no moment and the speed of the conveyor is easily controlled, giving great view density to areas of interest. In a preferred embodiment, the X-ray apparatus chain (93) described previously is moved through an arc (94) axial (95) to the luggage on the conveyor (92) moving in the direction of arrow (96); this will trace a helical pattern, the pitch of which will vary with the relative speeds of the lineal movement of the conveyor compared with the rotational speed of the X-ray chain. The X-ray chain can rotate through a full circle of 360° (describing a continuous helix axial to the luggage), requiring commutation with slip rings or rotating transformers between the electrical components; the apparatus is preferably reciprocated, oscillating through 180°, greatly simplifying electrical connection and reducing noise. Of course, multiple sources of radiation may also be used if desired, especially with the analog reconstruction apparatus previously described.

Figure 12:
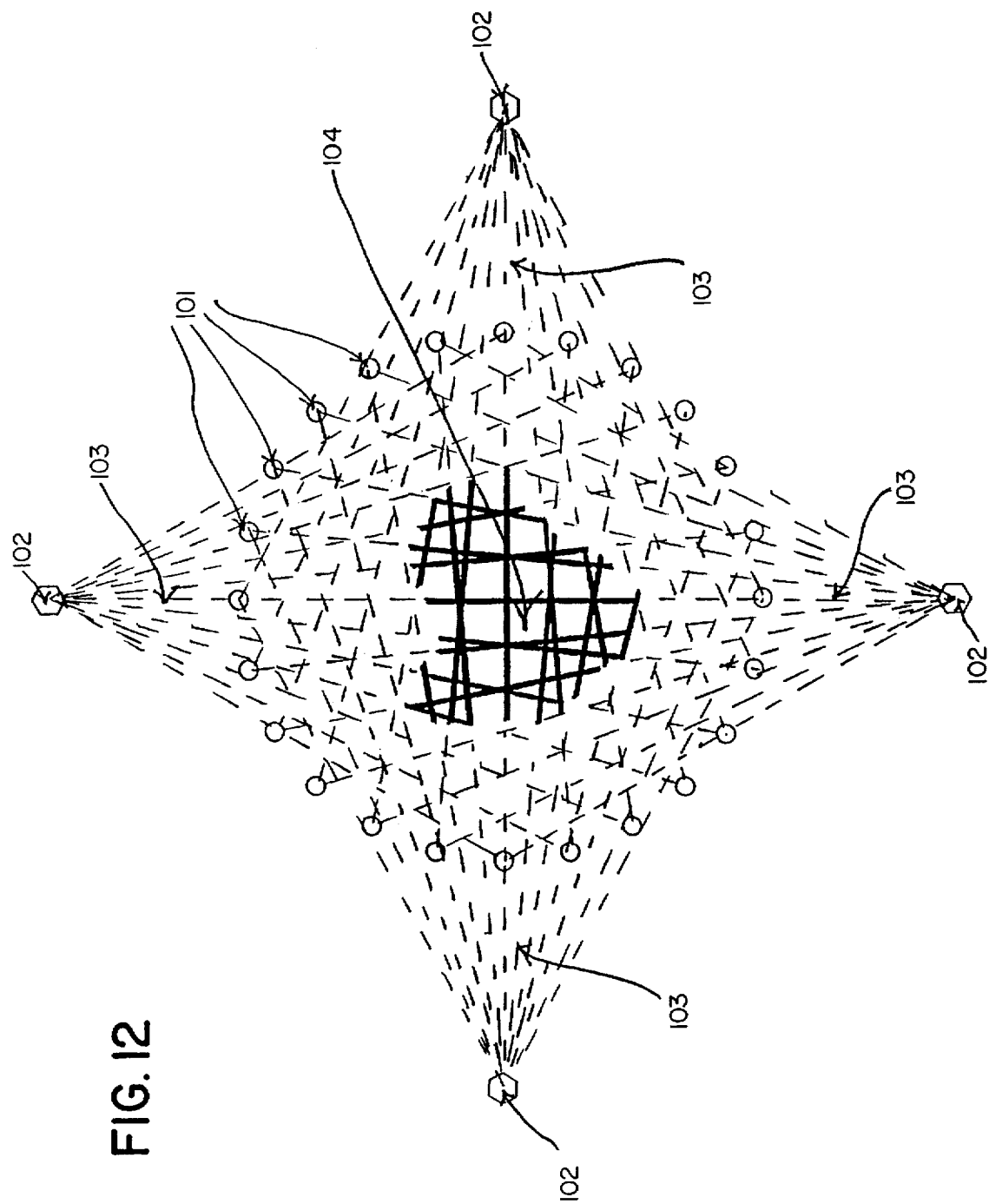
FIG. 12 is a schematic view of a reconstructed image obtained using seismic transducers and fanned integrals for forming an image.

Finally, it should be clearly understood that the arrays of data which constitute the views do not have to be combined as parallel lines or rectilinear views. Indeed, the reconstruction method of this invention will produce coherent images with any geometry of reconstruction which is analogous to any geometry of origination, so long as the geometrical scheme causes the integrals to superimpose. This principle is illustrated in FIG. 12 where an area of land is shown with electroacoustic or seismic transducers (101) implanted in the surface in some reproducible geometrical arrangement (in this case annular) which can be imitated on a computer. When some form of excitation (usually from explosive charges or a "thumper") is applied to selected locations (102), the disturbances are detected by the transducers. After ADC processing, the electrical values from the transducers are converted into backprojected line integrals (103) fanning out from the point origins of each exciting disturbance. Each set of fanned integrals therefore constitutes a view, and when all the views are combined by the transverse phase method of this invention, the emergent reconstruction (104) will image the subterranean geophysical properties of the land area as measured by the transducers. Because all of the different types of wavefronts do not arrive at the same time, it is well to rapidly make several successive reconstructions which may then be combined. Using the method of this invention, many geometrical schemes can be used to image any properties measurable by appropriate transducer.

The foregoing examples of applications of this new invention demonstrate and exemplify its broad utility for imaging and image reconstruction in a wide variety of circumstances. Those skilled in the art will quickly recognize new imaging opportunities because splendid images can be easily reconstructed from data acquired in many diverse and unusual ways.

While the invention has been described above with respect to certain embodiments thereof, it will be appreciated that variations and modifications may be made without departing from the spirit and scope of the invention.

What is claimed is:

1. A method for imaging or reconstructing an image of an object, comprising:
   (a) obtaining multiple original views of the object using an energy source, each original view being obtained at a different relative orientation of the object from each other view;
   (b) combining the multiple original views in an image plane to obtain a first composite image;
   (c) phase inverting the first composite image to obtain a phase inverted composite image;
   (d) determining a differential between the phase inverted composite image and each original view to obtain a plurality of differentials; and
   (e) combining the differentials to obtain a reconstructed image.

2. A method for imaging or reconstructing an image of an object, comprising:
   (a) obtaining multiple original views of the object, each original view being obtained at a different relative orientation of the object from each other view;
   (b) combining the multiple original views in an image plane to obtain a first composite image;
   (c) phase inverting the multiple original views to obtain multiple phase inverted original views;
   (d) determining a differential between the first composite image and each phase inverted original view to obtain a plurality of differentials;
   (e) combining the differentials to obtain a reconstructed image.

3. A method according to claims 1 or 2 further comprising phase inverting the reconstructed image to obtain a reconstructed image in phase with the original views.

4. A method according to claims 1 or 2 further comprising at least one amplifying step selected from: amplifying each differential in step (d) before combining the differentials in step (e), and amplifying the reconstructed image obtained in step (e).

5. A method according to claims 1 or 2 further comprising determining a differential between the reconstructed image in step (e) and each original view to obtain a plurality of differentials; and applying the plurality of differentials to the reconstructed image from step (e) to obtain a new reconstructed image, said new reconstructed image optionally being recombined with the reconstructed image from step (e).

6. A method according to claim 5 further comprising at least one amplifying step selected from: amplifying each differential in step (d) before combining the differentials in step (e), and amplifying the new reconstructed image obtained in step (e).

7. A method according to claim 1 or 2, further comprising the following steps, before combining the multiple original views in step (b):
   (a1) selecting a section of one of the original views obtained in step (a), said section having a plurality of data elements along its length, each data element having an intensity value;
   (a2) selecting a corresponding section from each of the other original views obtained in step (a), each said corresponding section having a plurality of data elements along its length, each data element having an intensity value; and
   (a3) backprojecting the intensity values of each of the data elements in each original view, wherein each backprojected data element forms a ray having multiple data elements of the same intensity value along its length, while maintaining the relative orientation of each section to each other section, wherein an array of the rays of each section are the views which are combined in step (b).

8. A method according to claim 7, wherein determining the differentials in step (d) comprises the following steps:
(d1) summing the intensity values of the multiple data elements in each ray of each original view to form a ray sum for each ray;
(d2) summing the intensity values of the multiple data elements in each ray of the phase inverted composite image to form a ray sum for each ray of the phase inverted composite image;
(d3) obtaining a differential between each ray sum for the original view and the corresponding ray sum for the phase inverted composite image; and
(d4) obtaining an average differential amount per data element by dividing the differential obtained in step (d3), by the number of data elements in each ray.

9. A method according to claim 8, further comprising determining a differential between the image from step (e) and each original view to obtain a plurality of differentials; and applying the plurality of differentials to the image from step (e) to obtain a new reconstructed image by the following step:
(f) simultaneously adjusting the intensity value of each data element in the reconstructed image by the amount of the average differential per data element obtained in step (d4) for each ray which passes through each data element.

10. A method according to claim 9, comprising repeating steps (d3) and (d4) and (f) to a point before the image data is extinguished, before an amplifying step is performed.

11. A method according to claim 8, wherein determining the differentials in step (d) comprises the following steps:
(d1a) subtracting the intensity values of the multiple data elements of an original view from the intensity values of the corresponding data elements of the corresponding composite image or subtracting the intensity values of the composite image from the intensity values of the corresponding multiple data elements of the original view, to obtain a differential between the original view and the composite image;
(d2a) repeating step (d1a) for each other original view to obtain a plurality of differentials.

12. A method according to claims 1 or 2, comprising obtaining the multiple original views of the object using an energy source selected from X-rays, visible light rays, non-visible light rays, ultrasound waves, acoustic waves, infrasound waves, radio waves, coherent light rays and modulated magnetic fields.

13. A method according to claims 1 or 2 comprising obtaining and processing data using a digital computer.

14. A method according to claims 1 or 2 comprising obtaining and processing data using analog methods.

15. A method according to claims 1 or 2 comprising obtaining and processing data using a combination of digital computer methods and analog methods.

16. A method according to claims 1 or 2 comprising reconstructing only a selected portion of the image by carrying out steps (d) and (e) for a selected portion of the image only.

17. A method according to claim 8 wherein the selected section comprises a single line of data elements and the method comprises combining the corresponding lines from each of the multiple original views.

18. A method according to claim 8 wherein the selected section comprises a slice including a plurality of single lines of data elements and the method further comprises averaging values of corresponding data elements for said plurality of single lines to obtain a line having an averaged value for each data element and the method comprises combining the corresponding averaged value line from the multiple original views.

19. A method according to claims 1 or 2 for reconstructing an image of a body of a person or animal, wherein step (a) comprises obtaining the multiple original views of the object using an energy source selected from X-rays, visible light rays, non-visible light rays, ultrasound waves, acoustic waves, infrasound waves, radio waves, coherent light rays and modulated magnetic fields, and the method further comprises recording the reconstructed image on sheet material.

20. A method according to claims 1 or 2 for reconstructing an image of an inanimate object, wherein step (a) comprises obtaining the multiple original views of the object using an energy source selected from X-rays, visible light rays, non-visible light rays, ultrasound waves, acoustic waves, infrasound waves, radio waves, coherent light rays and modulated magnetic fields, and the method further comprises recording the reconstructed image on sheet material.

21. Apparatus for imaging or reconstructing an image of an object, comprising apparatus selected from programmed computer apparatus and apparatus utilizing analog circuitry or a combination thereof, comprising;
(a) means for obtaining multiple original views of the object, each original view being obtained at a different relative orientation of the object from each other view;
(b) means for combining the multiple original views in an image plane to obtain a first composite image;
(c) means for phase inverting the first composite image to obtain a phase inverted composite image;
(d) means for determining a differential between the phase inverted composite image and each original view to obtain a plurality of differentials; and
(e) means for combining the differentials to obtain a reconstructed image.

22. Apparatus for imaging or reconstructing an image of an object, comprising apparatus selected from programmed computer apparatus and apparatus utilizing analog circuitry or a combination thereof, comprising:
(a) means for obtaining multiple original views of the object, each original view being obtained at a different relative orientation of the object from each other view;
(b) means for combining the multiple original views in an image plane to obtain a first composite image;
(c) means for phase inverting the multiple original views to obtain multiple phase inverted original views;
(d) means for determining a differential between the first composite image and each phase inverted original view to obtain a plurality of differentials;
(e) means for combining the differentials to obtain a reconstructed image.

23. Apparatus according to claims 21 or 22 further comprising digital or analog circuitry means for phase inverting the reconstructed image to obtain a reconstructed image in phase with the original views.

24. Apparatus according to claims 21 or 22 further comprising at least one means for amplifying selected from:

means for amplifying each differential in step (d) before combining the differentials in step (e), and means for amplifying the new reconstructed image obtained in step (e).

25. Apparatus according to claims 21 or 22 further comprising means for determining a differential between the reconstructed image in step (e) and each original view to obtain a plurality of differentials; means for applying the plurality of differentials to the reconstructed image from step (e) to obtain a new reconstructed image; and means for optionally combining said new reconstructed image with the reconstructed image from step (e).

26. Apparatus according to claim 25 further comprising at least one means for amplifying selected from: means for amplifying each differential in step (d) before combining the differentials in step (e), and means for amplifying the new reconstructed image obtained in step (e).

27. Apparatus according to claims 21 or 22, further comprising means for carrying out the following steps, before combining the multiple original views in step (b):
   (a1) selecting a section of one of the original views obtained in step (a), said section having a plurality of data elements along its length, each data element having an intensity value;
   (a2) selecting a corresponding section from each of the other original views obtained in step (a), each said corresponding section having a plurality of data elements along its length, each data element having an intensity value; and
   (a3) backprojecting the intensity values of each of the data elements in each original view, wherein each back-projected data element forms a ray having multiple data elements of the same intensity value along its length, while maintaining the relative orientation of each section to each other section, wherein an array of the rays of each section are the views which are combined in step (b).

28. Apparatus according to claim 27, wherein means for determining the differentials in step (d) comprises apparatus for carrying out the following steps:
   (d1) summing the intensity values of the multiple data elements in each ray of each original view to form a ray sum for each ray;
   (d2) summing the intensity values of the multiple data elements in each ray of the phase inverted composite image to form a ray sum for each ray of the phase inverted composite image;
   (d3) obtaining a differential between each ray sum for the original view and the corresponding ray sum for the phase inverted composite image; and
   (d4) obtaining an average differential amount per data element by dividing the differential obtained in step (d3), by the number of data elements in each ray.

29. Apparatus according to claim 28, further comprising means for determining a differential between the image from step (e) and each original view to obtain a plurality of differentials; and means for applying the plurality of differentials to the image from step (e) to obtain a new reconstructed image by the following step:
   (f) simultaneously adjusting the intensity value of each data element in the reconstructed image by the amount of the average differential per data element obtained in step (d4) for each ray which passes through each data element.

30. Apparatus according to claim 29, comprising means for repeating steps (d3) and (d4) and (f) to a point before the image data is extinguished, before an amplifying step is performed.

31. Apparatus according to claim 28, comprising means for determining the differentials in step (d) by carrying out the following steps:
   (d1a) subtracting the intensity values of the multiple data elements of an original view from the intensity values of the corresponding data elements of the corresponding composite image or subtracting the intensity values of the composite image from the intensity values of the corresponding multiple data elements of the original view to obtain a differential between the original view and the composite image;
   (d2a) repeating step (d1a) for each other original view to obtain a plurality of differentials.

32. Apparatus according to claims 21 or 22, comprising means for obtaining the multiple original views of the object using an energy source selected from X-rays, visible light rays, non-visible light rays, ultrasound waves, acoustic waves, infrasound waves, radio waves, coherent light rays and modulated magnetic fields.

33. Apparatus according to claims 21 or 22 comprising means for obtaining and processing data using a programmed digital computer.

34. Apparatus according to claims 21 or 22 comprising means for obtaining and processing data using apparatus comprising analog circuitry.

35. Apparatus according to claims 21 or 22 comprising means for obtaining and processing data using a combination of a programmed digital computer and analog circuitry.

36. Apparatus according to claims 21 or 22 comprising means for reconstructing only a selected portion of the image by carrying out steps (d) and (e) for a selected portion of the image only.

37. Apparatus according to claim 28, wherein when the selected section comprises a single line of data elements, the apparatus comprises means for combining the corresponding lines from each of the multiple original views.

38. Apparatus according to claim 28, wherein when the selected section comprises a slice including a plurality of single lines of data elements, the apparatus further comprises means for averaging values of corresponding data elements for said plurality of single lines to obtain a line having an averaged value for each data element and for combining the corresponding averaged value line from the multiple original views.

39. Apparatus according to claims 21 or 22 comprising means for reconstructing an image of a body of a person or animal, wherein step (a) comprises obtaining the multiple original views of the object using an energy source selected from X-rays, visible light rays, non-visible light rays, ultrasound waves, acoustic waves, infrasound waves, radio waves, coherent light rays and modulated magnetic fields, and the apparatus further comprises means for recording the reconstructed image on sheet material.

40. Apparatus according to claims 21 or 22 comprising means for reconstructing an image of an inanimate object, wherein step (a) comprises obtaining the multiple original views of the object using an energy source selected from X-rays, visible light rays, non-visible light rays, ultrasound waves, acoustic waves, infrasound waves, radio waves, coherent light rays and modulated magnetic fields, and the apparatus further comprises means for recording the reconstructed image on sheet material.

* * * * *

UNITED STATES PATENT AND TRADEMARK OFFICE
CERTIFICATE OF CORRECTION

PATENT NO. : 5,761,331
DATED : June 2, 1998
INVENTOR(S) : CLARK, III

It is certified that error appears in the above-identified patent and that said Letters Patent is hereby corrected as shown below:

Title page, should read as follows:

[73] Assignee: Patent is not assigned.

Please correct Fig. 6A as shown below.

FIG. 6A

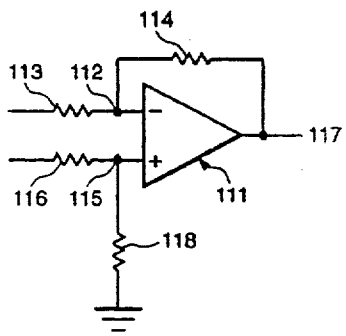

Signed and Sealed this

Sixth Day of October, 1998

Attest:

BRUCE LEHMAN

Attesting Officer

Commissioner of Patents and Trademarks